United States Patent
Jenkinson et al.

[15] 3,635,388
[45] Jan. 18, 1972

[54] FRICTION WELDING APPARATUS

[72] Inventors: Brian E. Jenkinson, Barkston, near Grantham; Geoffrey W. Watson, Grantham; Peter B. Foister, Melton Mowbray, all of England

[73] Assignee: Steelweld Limited, Grantham, England

[22] Filed: Jan. 30, 1969

[21] Appl. No.: 795,306

[30] Foreign Application Priority Data

Feb. 5, 1968 Great Britain ....................... 5,666/68

[52] U.S. Cl. ................................... 228/2, 29/470.3, 308/9
[51] Int. Cl. .................................................... B23k 27/00
[58] Field of Search ..................... 228/2; 29/470.3; 156/73; 308/9

[56] References Cited

UNITED STATES PATENTS

| | | | |
|---|---|---|---|
| 3,452,422 | 7/1969 | Calton et al. ....................... 29/497.5 X |
| 3,516,591 | 6/1970 | Gage ....................................... 228/2 |
| 3,412,916 | 11/1968 | Dunlap et al. ............................. 228/2 |
| 3,380,641 | 4/1968 | Deemie et al. ............................ 228/2 |
| 3,337,108 | 8/1967 | Taylor ...................................... 228/2 |

*Primary Examiner*—John F. Campbell
*Assistant Examiner*—R. J. Craig
*Attorney*—Larson, Taylor and Hinds, Walter Gillis, Marvin Petry, Thomas P. Sarro and Ross F. Hunt, Jr

[57] ABSTRACT

In a friction welding machine one workpiece chuck is urged by a ram or rams towards a second workpiece chuck which is rotatable. The second chuck is supported in bearings with freedom for limited axial displacement under axial thrusts transmitted to it from the ram or rams through the workpieces and is supported against the thrusts by a hydrostatic thrust bearing.

5 Claims, 2 Drawing Figures

PATENTED JAN 18 1972  3,635,388

FRICTION WELDING APPARATUS

DESCRIPTION

This invention comprises improvements in and relating to friction welding apparatus of the class, herein referred to as "the class specified," which basically comprises at least one pair of chucks in which the workpieces to be joined are held, at least one of the chucks being rotatively driven to effect the relative rotation of the contacting workpieces to cause friction heating, and the chucks being relatively axially displaceable by a ram or rams to apply the required axial welding loads between the frictionally heated workpieces.

High relative rotational speeds and widely varying, and ultimately high, axial loads are necessary to produce a good friction weld. The axial load is usually low initially, is increased during the friction heating stage up to welding and is increased further during the final forging stage after relative rotation has been stopped. Axial pressures of the order of 20 tons/in.$^2$ are usual during this last stage.

As a consequence of the loads employed, design difficulties occur particularly in regard to supporting the workpiece chucks through rolling bearings.

These difficulties are avoided by the present invention, according to which in a friction welder of the class specified one chuck is moved by the ram or rams and the second chuck is supported in bearings so as to have freedom for limited axial displacement under the axial thrust of the ram or rams through the workpieces and is supported against such axial thrust by a hydrostatic thrust bearing.

For example, in a friction welder in which one chuck is displaced axially by the ram or rams to produce the axial welding loads and the second is rotatively driven, the rotating chuck and parts rotating with it may be located axially by a hydrostatic bearing arranged so that wide variations in the axial load are accommodated by small displacements of these parts. The one chuck, which is nonrotating, may conveniently be carried by the piston of an hydraulic ram or rams. In this case, the same hydraulic high-pressure supply can be used for operating the ram and for feeding hydraulic fluid to the hydrostatic thrust bearing.

The accompanying drawings illustrate diagrammatically one form of friction welder of this invention and some features utilizable with the welder, in which drawings.

Figure 1:
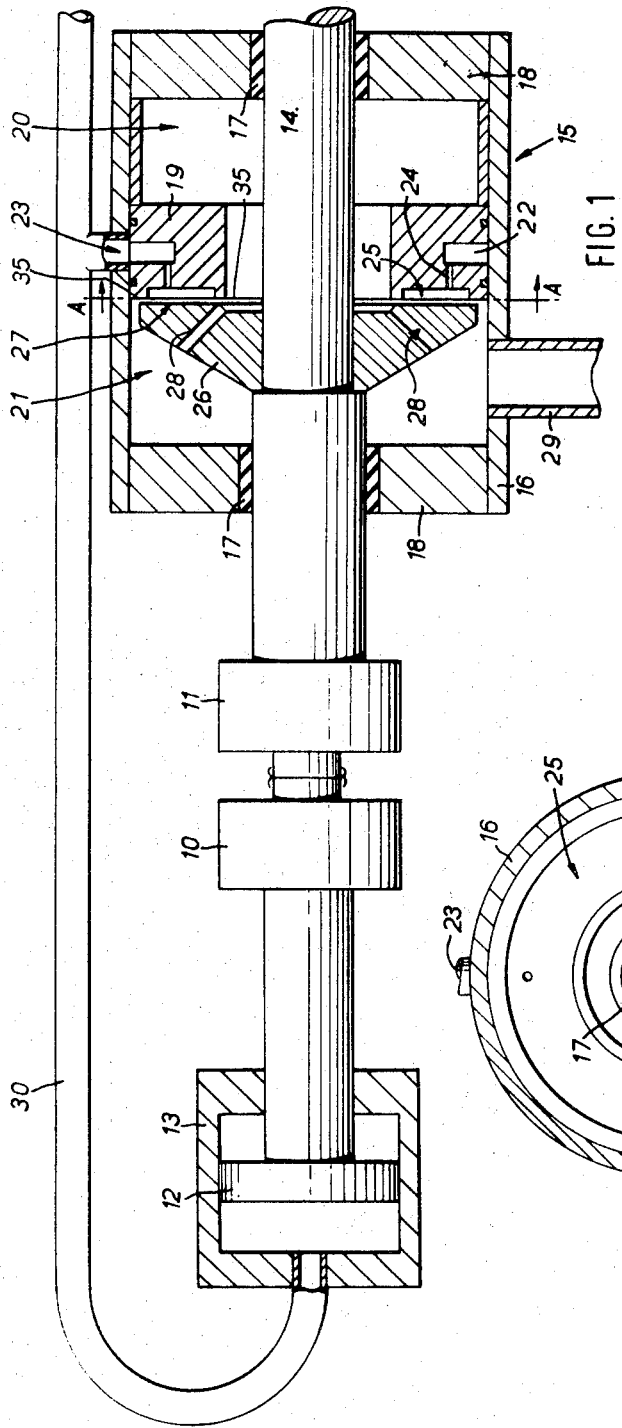
FIG. 1 illustrates the welder.
Figure 2:
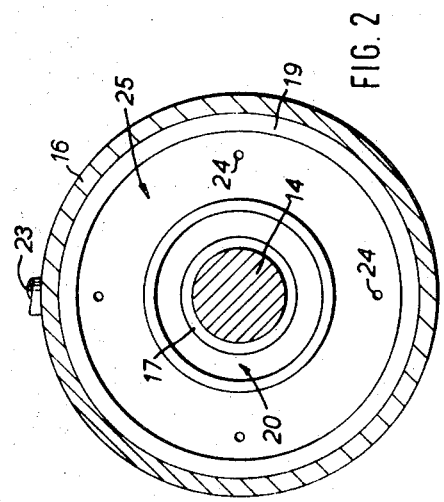
FIG. 2 is a section on the line A—A of FIG. 1.

The welder comprises, FIGS. 1 and 2, a nonrotating chuck 10 which is axially movable by being connected to the piston 12 of an hydraulic ram 13 for applying the welding loads. The ram is supplied with high-pressure liquid for its operation from pipeline 30.

The welding apparatus also has a rotatable chuck 11 carried on an axial-driven shaft 14 which extends through a bearing arrangement 15.

The bearing arrangement 15 comprises a housing 16 with axially spaced journal bearings 17 in end walls 18 supporting the shaft 14 with freedom for axial displacement, and is also such as to support the shaft with limited movement against the high and widely varying axial loads transmitted to the chuck 11 through the workpieces during welding.

Thrust loads are taken in the bearing arrangement 15 as follows. An internal annular diaphragm 19 is fixed within the casing 16 between two chambers 20, 21, and the diaphragm 19 has in it a gallery 22 communicating with pipeline 30 through a pressure liquid supply port 23. The diaphragm 19 also has axial drillings 24 leading from the gallery 22 to recessing 25 which may be an annular channel, or series of pockets angularly spaced around the annulus, in the end surface facing chamber 21 and thus facing axially towards the chuck 10.

The shaft 14 carries an annular collar 26, one face 27 of which is close to but spaced from the surface containing the recessing 25, the face 27 extending radially inwardly and outwardly beyond the recessing 25 so as to leave axially narrow outlets such as small leakage gaps 35. Drillings 28 lead from the inner limit of face 27 to the chamber 21.

A conduit 29 leads from chamber 21 to a drain tank.

In operation, the pressure liquid leaks from the channel, or pockets, 25 radially through the leakage gaps 35 and this leakage flow creates a drop in fluid pressure with this arrangement there is thus a resultant load acting towards the left in the drawing against any thrust load transmitted from piston 12 through the workpieces to the shaft 14. If this thrust load on piston 12 increases, the shaft 14 moves axially a small amount to the right so that the leakage gaps 35 decrease so increasing the pressure difference across, and fluid load on, the collar 26. Conversely, if the thrust load on piston 12 decreases the shaft 14 moves a small amount to the left to increase the size of gaps 35 and decrease the pressure difference. As noted, the extent of axial movement of the shaft 14 to accommodate large thrust load changes is small. The movement is made even smaller by the fact that the same pressure supply is used for the thrust bearing as for the ram 13.

We claim:

1. Friction welding apparatus of the class comprising a pair of chucks in which the workpieces to be joined are held, the chucks being relatively axially displaceable by an hydraulic ram to urge workpieces held in the chucks into contact and the chucks being relatively rotatable to cause friction heating of the contacting workpieces, characterized in that one chuck is connected to be displaced axially by the ram to produce the axial welding loads and the second chuck is rotatively driven, there being a hydrostatic bearing supporting the second chuck and other rotating parts against axial loads transmitted thereto from said hydraulic ram, said hydrostatic bearing including a high-pressure space and a low-pressure space interconnected by clearances, and means for varying the size of said clearances in the axial direction in response to variations of the welding load applied by the ram such that an increase in the welding load reduces the size of the clearances, thus increasing the pressure of the hydrostatic bearing, and a decrease in the welding load causes the size of the clearances to increase, thus decreasing the pressure of the hydrostatic bearing, and there being a high-pressure liquid supply and a common connection from said supply to said hydraulic ram and to said high-pressure space of the hydrostatic bearing.

2. Friction welding apparatus according to claim 1, comprising a shaft rotatively driving the second chuck, the hydrostatic thrust bearing for the second chuck comprising a casing through which the shaft extends, the casing having a diaphragm with recessing facing axially towards the said one chuck, an annular collar connected to move axially with the shaft and having a radial face close to and extending radially inwardly and outwardly beyond the recessing, the high-pressure liquid supply being connected to the recessing and there being a drain from the casing, there being a leakage path for flow of pressure fluid from the recessing past the face to the drain thereby creating an hydraulic thrust-opposing load on the collar.

3. Friction welding apparatus according to claim 2, said recessing being an annular channel.

4. Friction welding apparatus according to claim 2, said recessing being an annular arrangement of pockets.

5. Friction welding apparatus of the class comprising a pair of chucks in which the workpieces to be joined are held; support means comprising a ram having an axially displaceable nonrotating ram piston, one of said pair of chucks being mounted for axial displacement on said piston; a bearing arrangement including a hydrostatic journal bearing means and a hydrostatic thrust bearing means; and a driven shaft rotatively mounted in said bearing arrangement, the second of said pair of chucks being mounted on said shaft; said hydrostatic thrust bearing means including a casing, a diaphragm fixedly mounted in said casing and encircling said shaft, a collar fixed on said shaft, said diaphragm and said collar being axially spaced and having cooperating axially facing surfaces defining between them a high-pressure space with radially extending axially narrow outlets from said high-pressure space to a low-pressure space within said casing; the size of said outlets and hence also the pressure of the hydrostatic bearing varying in response to small axial movements of the ram as the pressure applied to the ram, and hence the thrust applied by the ram varies, and a high-pressure liquid source and a common supply connection from said source to said ram and to said high-pressure space.

* * * * *